April 15, 1941.  E. A. NELSON, JR  2,238,873
SELECTIVE CONTROL CIRCUIT FOR UNIT TABULATING MACHINES
Filed Oct. 14, 1938  6 Sheets-Sheet 1

INVENTOR
E. A. NELSON, JR.
By J. F. Mothershead
ATTORNEY

April 15, 1941.  E. A. NELSON, JR  2,238,873
SELECTIVE CONTROL CIRCUIT FOR UNIT TABULATING MACHINES
Filed Oct. 14, 1938    6 Sheets-Sheet 3
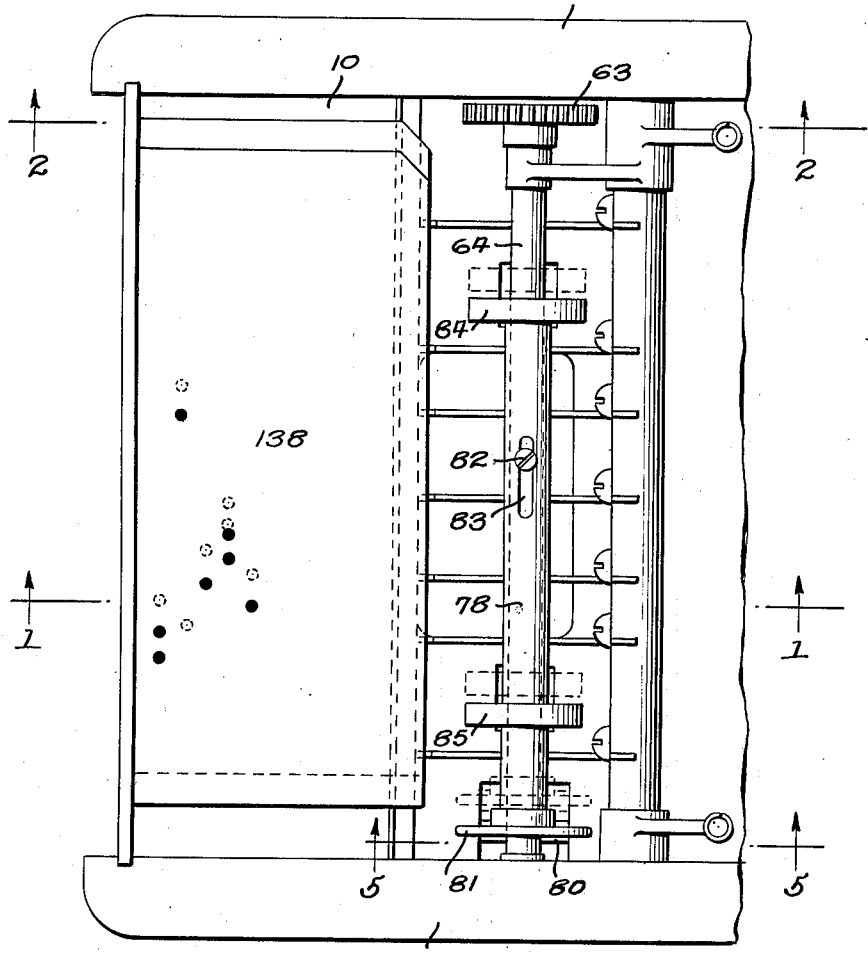
Fig. 3.
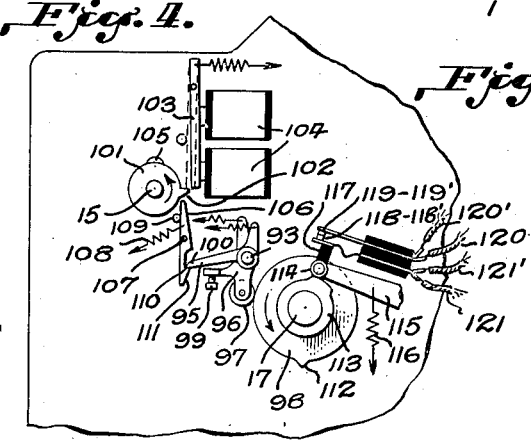
Fig. 4.
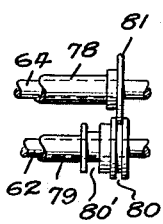
Fig. 5.
Fig. 6.
INVENTOR
E. A. NELSON, JR.
By J. F. Motherhead
ATTORNEY

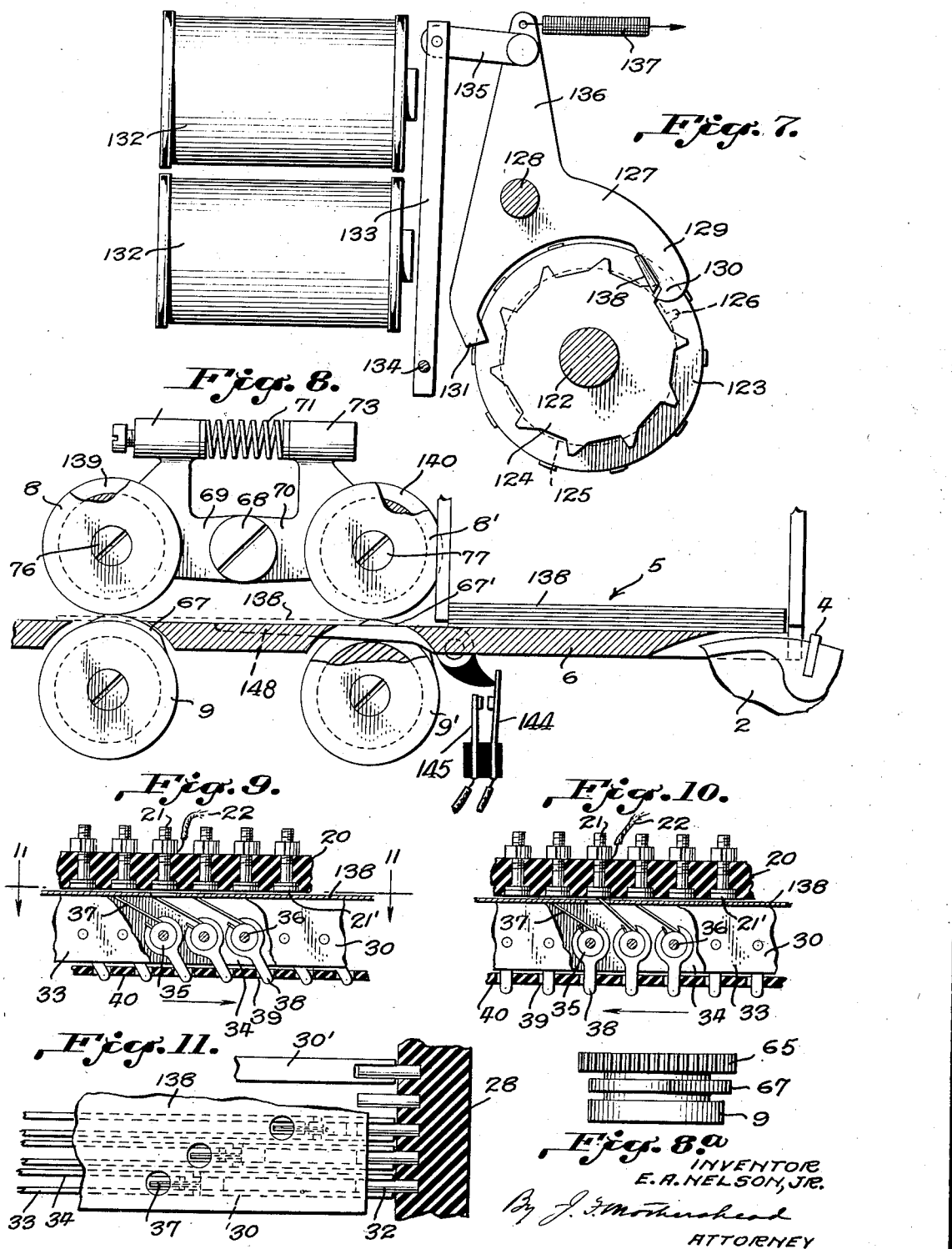

April 15, 1941. E. A. NELSON, JR 2,238,873
SELECTIVE CONTROL CIRCUIT FOR UNIT TABULATING MACHINES
Filed Oct. 14, 1938 6 Sheets-Sheet 5
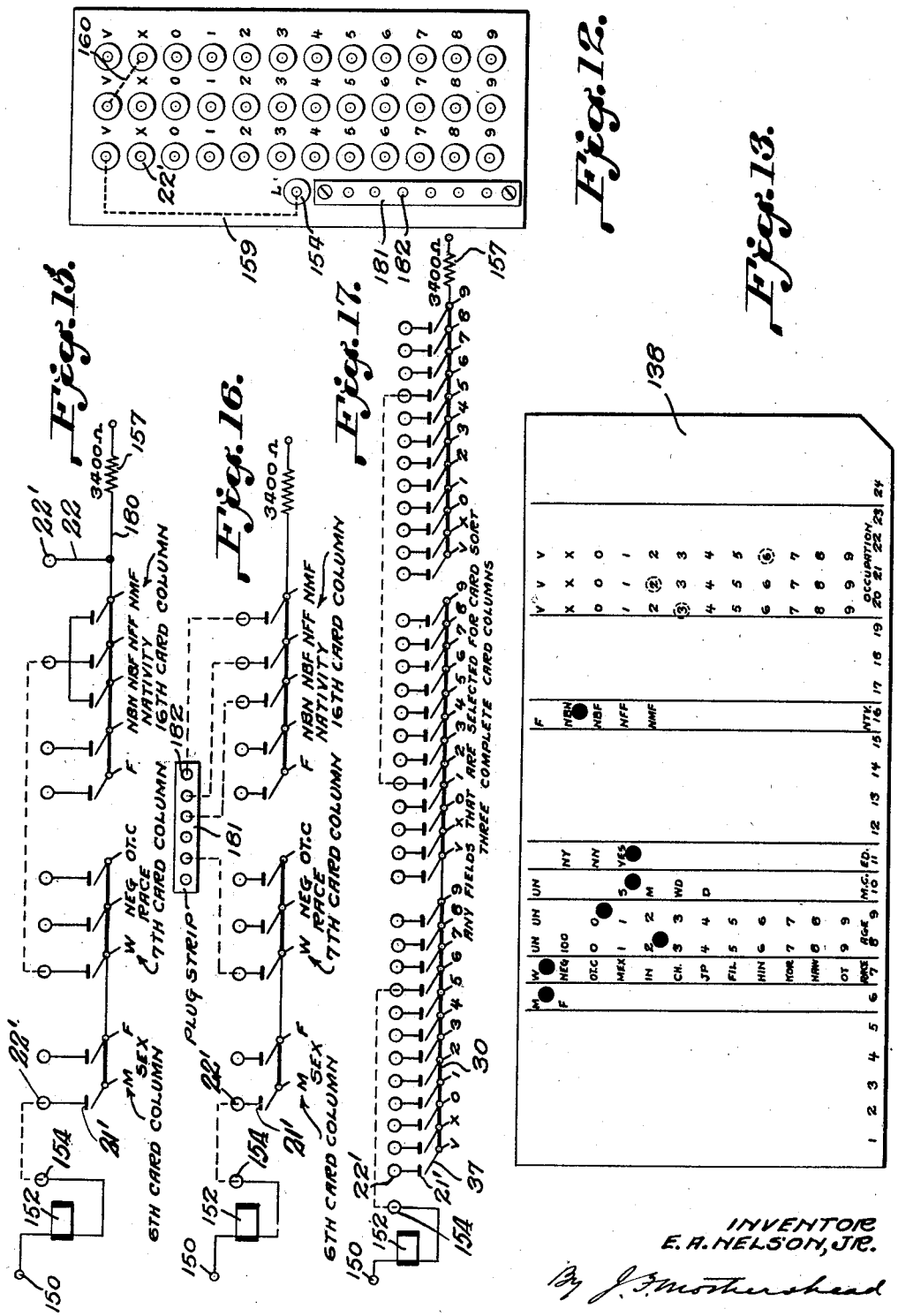
INVENTOR
E. A. NELSON, JR.
ATTORNEY Patented Apr. 15, 1941

2,238,873

UNITED STATES PATENT OFFICE 2,238,873

SELECTIVE CONTROL CIRCUIT FOR UNIT TABULATING MACHINES

Edgar A. Nelson, Jr., Silver Spring, Md.

Application October 14, 1938, Serial No. 235,113

2 Claims. (Cl. 235—61.6)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (ch. 460, 45 Stat. L. 467).

This invention relates to a selective control circuit for unit tabulating machines, and more particularly to those machines of this character employed in census or statistical work.

The cards run in these machines, as is well known, have holes in them indicating various information, represented by various names, designations and symbols appearing in the fields or subdivision into which the cards are subdivided. The cards have been previously "sorted" in a sorting machine into different groups or classes, such for instance as "state," "county," "sex," "race," "nativity," etc., and the object is to tabulate from the "sorted" group some particular information about persons in that particular group. For instance, in a group that has been sorted for "male" white of native born parentage, it is desired to know if the person is educated, where born, or what his occupation is, or information as to the marital condition of such person,—as to being single, married, widowed or divorced, all of this information being, as intimated, indicated on the card by holes punched adjacent to an appropriate symbol or designation in a field on a card devoted to any of the conditions desired to be tabulated. When such information is required, the brushes in the machine are arranged to close only circuits appropriate to the information desired to be taken off the card. In the usual unit tabulating machines, the counter and relay circuits are each wired in series, and it is necessary to use a current from ⁷⁄₁₀ to one ampere at 220 volts for each circuit. To operate these counter and relay circuits, the current contact is made simultaneous by small wire brushes, light in tension, making contact through the different holes punched in the card. These contacts are controlled by master contacts that turn the current on and off, thereby eliminating the actual making or breaking of the circuits on the small wire brushes. By this I mean that the current is so controlled that it is on for only an infinitesimal moment at which the brush is making the contact through the hole in the card, and is cut off before the brush leaves the hole.

Owing to the high speed of the machine, frequently up to 400 contacts a minute, if any of the wire brushes have to continuously make the same contact on each card, or say about 100,000 cards at this high speed, with current from ⁷⁄₁₀ to one ampere at 220 volts, the ends of the brushes heat up after which they make poor contact and finally must be replaced. On these machines it is highly desirable to have a control so that any of a certain group of cards can be tabulated, and any card of another group that by inadvertence or otherwise finds its way into the group being tabulated, will be automatically rejected (that is to say, not tabulated), but as intimated, it is not practicable for the reasons given, to include a card class control in the usual counter or relay circuit. Therefore, one of the important objects of this invention is to provide a separate selective control circuit using a brush contact for each possible hole in each card of a "sort" or "class" of cards to be controlled. This control circuit includes a plug-board to accommodate complete columns of the card, together with appropriate line connections, ample jacks, and necessary cord-attached plugs, and efficient relay of high resistance, as well as other units of high resistance, and the necessary wiring connected to the relay timing contact, producing a complete independent circuit of high resistance, allowing the use of a weak current, in the present contemplated arrangement less than ³⁄₁₀₀ (0.03) of an ampere (at the above mentioned 220 volts), to pass through the brushes, thereby prolonging their life indefinitely.

Another object of the invention is to so locate the relay contact of the "class" control relay in the counter circuit with respect to the branch circuit of the reject counter that the counters cannot operate unless the card class and card control are the same.

Throughout the following specification, when the term "counter" is used it means one of a numerous number of counters, each in the present instance composed of four disks having on the periphery thereof appropriate numerals usually from "0 to "9" with a counting capacity of 9999. These counters are mounted upon suitable shafts and electrically controlled individually by suitable mechanism actuated by electrical impulses as usual.

It should be understood at the outset that the card "class" control is not confined to any particular column or any given number of columns of a card, but may be from one column up to the capacity wiring of the machine, and the plug-board will be just as flexible.

In order to more clearly show the applicability and aid in the understanding of the circuits herein illustrated and which will be described in detail, I have illustrated so much of a unit tabulating machine in common use as is thought to be sufficient for the purpose.

In the drawings—

Figure 1 is a vertical sectional view through the machine taken substantially on line 1—1 of Figure 3, intended to show more particularly the arrangement of the contact block or contact holder with relation to the brush holders and shuttle plate which rocks the brushes on their pivots in appropriate direction as the exigencies of their operation require. The figure also shows the card feed drum and stacking mechanism.

Figure 3 is a plan view of so much of the machine as is necessary to show the card reject mechanism located between the stacker hopper and the brush holders.

Figure 4 is a detailed view of the timing contact mechanism that controls the relay and counter circuits, and the relationship between said mechanism and the card reject mechanism.

Figure 5 is a view taken about on line 5—5 of Figure 3, showing the two feed rolls on the right side of the machine, rocker arm and operating cam.

Figure 6 is a fragmentary detail view of the sleeves mounted on their respective shafts and shifting discs.

Figure 7 is a detail of the counter disk, escapement and counter-disk control magnet, the whole assemblage constituting a counter.

Figure 8 is a detailed view showing the feed hopper, feed rolls, and a fragment of the feed drum.

Figure 8a is an edge view of the lower feed roll, cam and gear.

Figure 9 is a fragmentary sectional view of the contact block or holder showing its relation to a card, brush holders, and the shuttle plate.

Figure 10 is a similar view wherein is shown the brushes in operative position, one of which is shown in contacting position.

Figure 11 is a plan of Figure 9, more particularly intended to show the spaced arrangement of the brush holders.

Figure 12 is a plan view of a plug-board for use in connection with the various class control circuits for selecting any particular card.

Figure 13 is a plan view of a sample punched card punched and marked in conformity with the circuit illustrated in Figure 14, and containing certain symbols, numerals, abbreviations, designations, etc., which may appear upon a card used in a branch of census work.

Figure 15 is a view of the improved card class control circuit, certain of the contacts being consolidated.

Figure 16 is a view of the circuit showing a plug-receiving strip or receptacle of conductive material which is, in practice, located on the plug-board.

Figure 17 is a card class control circuit arranged for any number of rows of figures, symbols or designations in any sub-division or field on any card having up to the maximum possible designations in each of the columns of symbols, designations or figures.

*General*

Figure 1:
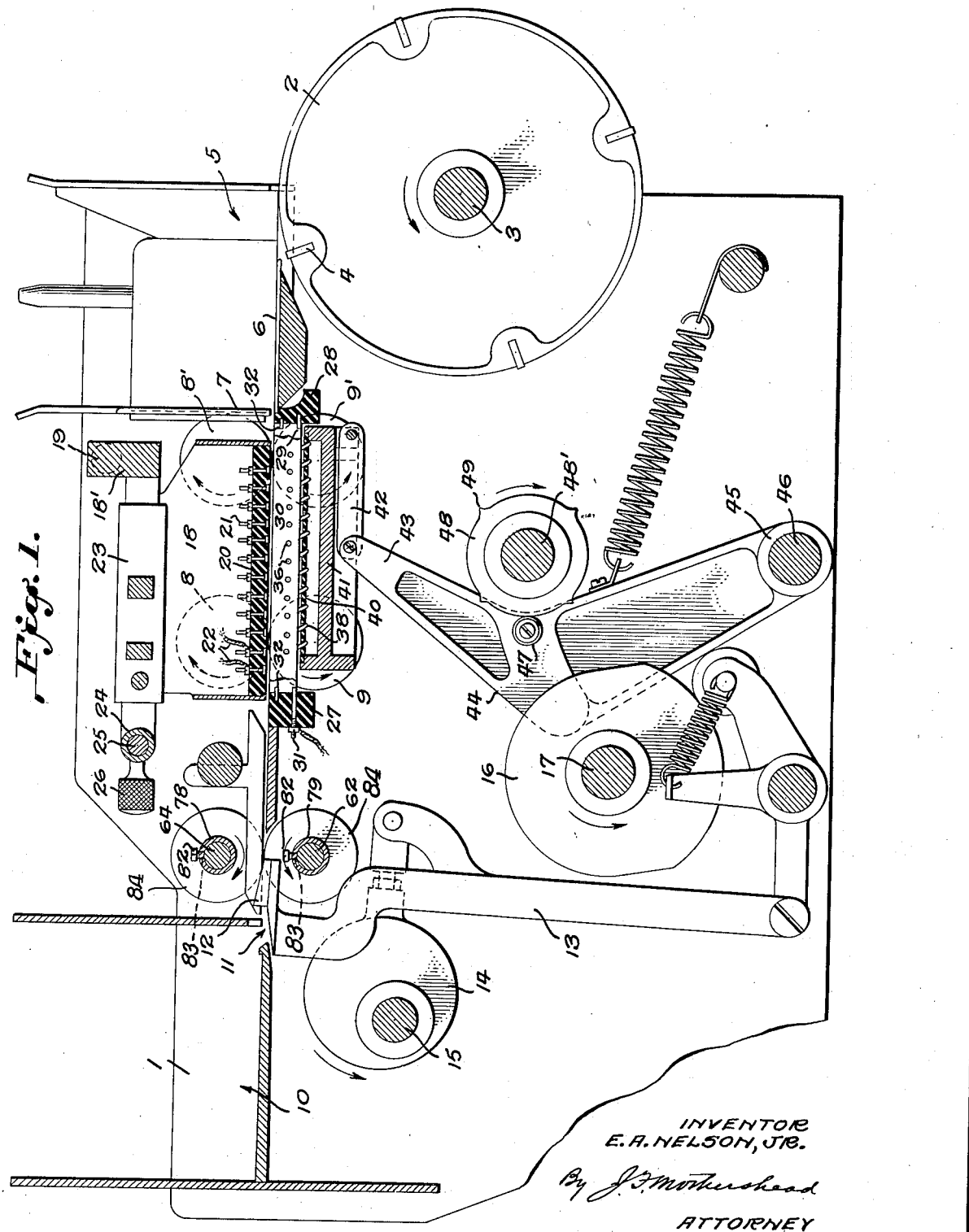

Referring particularly to Figure 1, the numeral 1 designates one of the side plates of a unit tabulating machine in common use, there being, of course, an opposite plate (not shown) in which plates are supported various cross elements which serve as supports for various parts of the machine, and in which various shafts are journaled for mounting various cams, gears, etc. cooperating and coordinating for the accomplishment of the purpose for which the machine is designed.

The numeral 2 designates the feed drum mounted on shaft 3 journaled in suitable bearings at the forward end of the machine. This drum carries a suitable number of feed knives 4 which extend, as usual, a short distance beyond the periphery of the drum and are adapted to engage the side edge of the card (not shown) to feed the same out of the usual feed hopper over the rest 6 and under the adjustable gate 7 to upper feed rolls 8 and lower feed rolls 9.

The numeral 10 designates the stacker hopper or the hopper in which the tabulated cards are to be stacked after they have been run through the machine. This is located at the end of the machine opposite the feed hopper and is of the usual construction wherein there is a slot 11 for the entrance of the cards as they are fed into the hopper by the feed knives 12 supported by the rocker arm 13, which has a composite movement controlled by the eccentric 14 mounted on a driven shaft 15 and a cam 16 mounted on a driven shaft 17, through the linkage shown.

Interposed between the two hoppers 5 and 10 is a box 18 provided with a cross bar 18' which carries a stud 19 by which said box is pivoted to the side plates. The box is for the reception of the contact block or holder 20 which is suitably secured in the box preferably by screws passing through the sides and ends of the box and into the insulating material of which the block is formed. This block contains numerous tungsten-tipped contact pins 21, one for each possible hole in a card, and which are connected by suitable conductors 22, all of which conductors are, in practice, enclosed within a suitable manifold or cable leading to several convenient parts of the machine, including the plug-board hereinafter described.

On the upper edge of the box is a forwardly-extending member 23, there being two of these, one on each side of the box and connected by a metallic sleeve 24 within which is a spring-backed bolt 25 manually operable by a knurled knob 26, which also serves as a handle for locking, unlocking and raising the box to gain access to the mechanism there-below which will now be described.

The numerals 27 and 28 represent spaced strips of insulating material suitably supported on the side plates of the machine and provided along their inner edges are numerous spaced supporting pins 29 which extend a short distance into the brush holder 30 and in direct contact therewith. In the same plane with the pins 29 at the other end of the holder 30 are numerous spaced contact pins 31 which extend entirely through the insulating strip 27 and a short distance into the brush holder, and through which pins the whole "strip" or particular brush holder is energized. Above these pins 29 and 31 are others 32 which are imbedded in the strips of insulating material and extend a short distance into the brush holder for the sole purpose of holding them in true vertical position.

Each brush holder is composed of two thin metallic strips 33 and 34 (see Figures 1 and 11), between which are the brush mountings 35 pivoted at 36. To these mountings are secured brushes 37, the mountings being formed with extensions 38 which extend through apertures 39 in the plate 40 of insulating material, which is carried in the shuttle plate 41. Attached to the shuttle plate 41 is a link 42 whose other end is pivotally connected to the upper arm 43 of a rocker arm 44, whose lower end is pivoted at 45 to a supporting shaft 46 suitably mounted in side plates. This arm carries a roller 47 which bears against the cam 48 mounted on a shaft 48', which cam at intervals is provided with high points 49 which, when they engage the roller on the rocker arm, impart a rocking movement thereto to actuate the shuttle plate.

Drive mechanism

Figure 2:
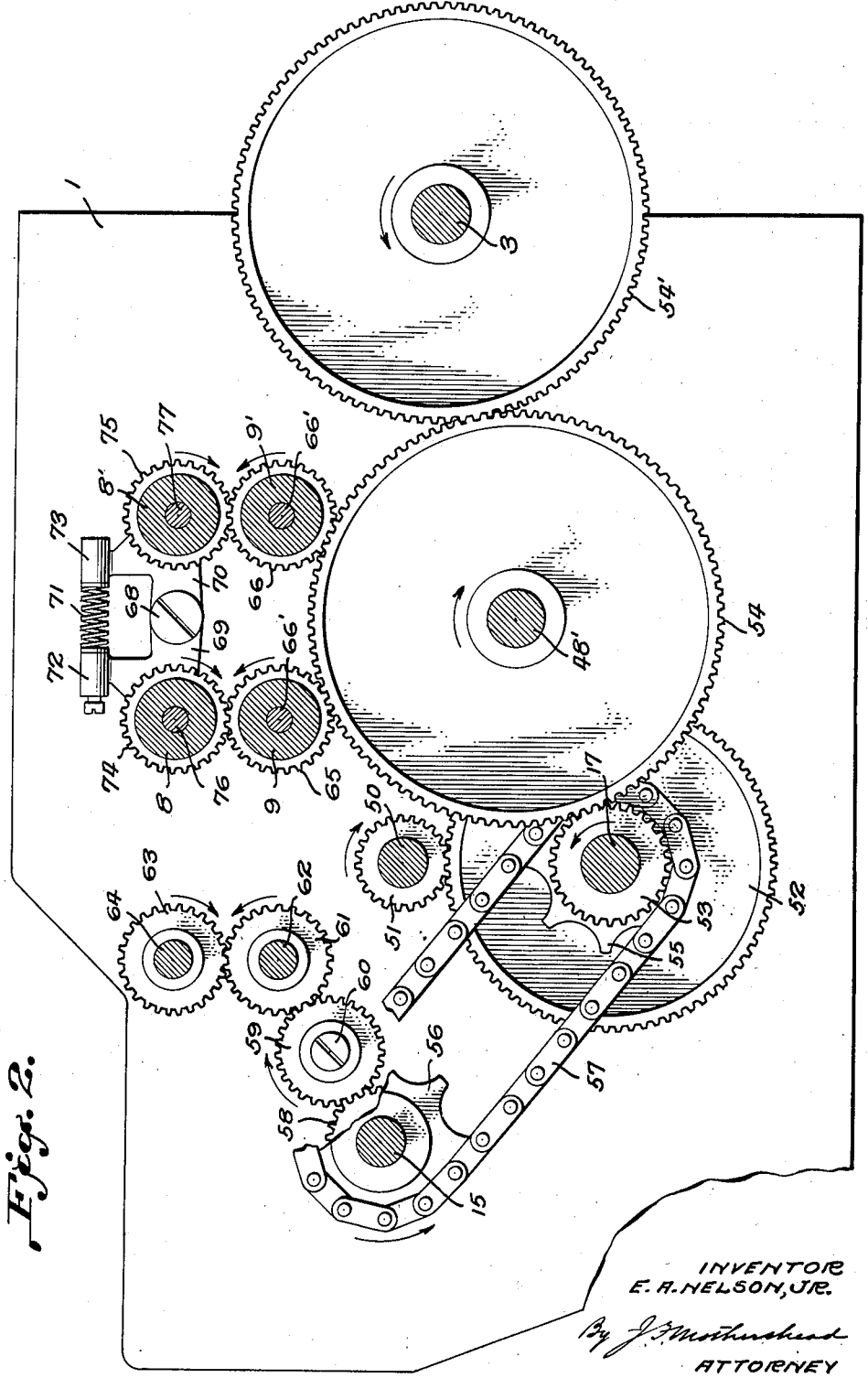
Figure 2 is a similar view taken about on line 2—2 of Figure 3, showing the drive mechanism.

Referring to Figure 2, the numeral 50 designates the main drive shaft which is driven by a suitable motor, unnecessary to show. Mounted on this shatf is the gear 51 in mesh with larger gear wheel 52 mounted on shaft 17 on which there is also mounted gear 53 which in turn meshes with gear wheel 54 which drives some of the feed rollers and the feed drum (Figure 2), as will presently more particularly appear. Mounted on the shaft 17 is a sprocket 55, and on shaft 15 is a similar sprocket 56 driven by the sprocket 55 through the medium of a sprocket chain 57. Also on the shaft 15 is a gear 58 in mesh with an idler gear 59 mounted on stud 60 secured to the side plate, which idler in turn meshes with a gear 61 mounted on shaft 62 upon which shaft is also mounted certain parts of the card reject mechanism, including feed rolls, as will presently appear. The gear 61 is in mesh with a similar gear 63 mounted on shaft 64 upon which is also mounted other parts of the reject mechanism, also including feed rolls.

In mesh with the larger gear 54 are two smaller gears 65 and 66 which are mounted on studs 66' secured to the side plates, which gears are integral with the feed rollers 9 and 9', the rollers having closely associated therewith cams 67 and 67', which at proper intervals are brought into contact with the peripheries of the feed rolls 8 and 8' (Fig. 8).

Above the feed rolls 9 and 9' (Fig. 8) and mounted on stud 68 are two rocker arms 69, 70, which are pivotally mounted on the stud and capable of a slight rocking movement relative to each other under the influence of a spring 71 interposed between extensions 72 and 73 formed integral with the arms 69 and 70 (Figures 2 and 8). The feed rolls 8 and 8' and their integral gears 74 and 75 are mounted on studs 76 and 77 carried by the rocker arms 69 and 70.

The large gear 54 meshes with the gear 54' mounted on shaft 3, together with the feed drum, whereby said drum is driven to feed the cards into the machine.

Card reject mechanism

Referring now particularly to Figure 3, the numeral 78 designates a sleeve that surrounds the shaft 64 and is movable laterally thereon. Directly below this sleeve is another sleeve 79 (Fig. 6) these sleeves being arranged to move in unison and laterally for the same distance, there being on the lower sleeve a grooved disk 80, the groove receiving and embracing the periphery of a plain disk 81 carried by the upper sleeve 78 (Figure 6). The headed screws 82 are threaded into the shafts 62 and 64 and extend through elongated slots 83, one of which slots is provided in each sleeve, the purpose being to cause the sleeve to rotate with the shafts and to allow the sleeves to have lateral movement thereon. Mounted on sleeves 78 and 79 are feed rolls 85, similar to rolls 84. The sleeves 78 and 79 extend beyond the feed rolls 85 and the upper one carries the plain disk 81 and the lower one carries the grooved disk 80 (Figure 6), the former disk extending into the groove in the latter to enable the sleeves to move laterally in unison when necessary to eject improperly punched cards.

The mechanism by which this lateral movement of the feed rolls is accomplished includes a rocker ram (Figure 5) 86 pivoted between ears 87, carried by a side plate 1, which arm is provided at its upper end with a yoke 88 that embraces or straddles the sleeve 79 and constantly bears against the faces of a grooved disk 80' under the influence of a coiled spring 89, one of whose ends is attached to a pin on the lower end of the rocker arm, and the other to a side plate 1. This rocker arm also carries a roller 90, as shown in dotted lines in Figure 5, which lies in the path of the high portion of the face cam 91 on shaft 17 Figure 5. Adjacent the rocker arm 86 is a locking pawl 92 mounted on a short shaft 93 which passes through the side plate, the free end of the pawl being provided with a lug 94 which is caused, at appropriate times, to engage the rocker arm to prevent said arm from coming in contact with the cam, which is desirable so long as cards that are running through the machine are properly and consistently punched, or are, in other words, correct. However, when an improperly punched card, which is one to be rejected, is passing under the reject feed roll, then the pawl is arranged to release the rocker arm and permit it to engage the cam and permit said arm to rock on its pivot, thereby shifting the feed rolls laterally through the medium of the yoke 88, the grooved disk 80 and the disk 81.

As has been stated, the shaft 93 extends through a side plate 1, and, as shown in Figure 4, has mounted thereon on the other side of the plate from the pawl 92, a bell-crank lever 95 which is pinned to the shaft. Also loosely mounted on the shaft 93 and interposed between the hub of the bell-crank and the side plate is a member 96 which carries a roller 97 arranged to bear against the periphery of a disk 98, and said member also carries a set-screw 99 by which the roller-carrying member may be adjusted with relation to the laterally-extending arm 100 of the bell-crank.

Frictionally mounted on the shaft 15 is a drum 101, which, on one side, carries a lug 102 which engages the lower end of the armature 103 of the magnet 104, whereby said drum is held against rotation. Pivoted in said drum and in a different vertical plane from the lug 102 is a roller 105 which is arranged to operate a latch 106 pivoted at 107 to the side plate, there being a spring 108 keeping the latch rocked normally toward the bell-crank, the movement of the latch being limited in one direction by the stop 109. The latch below its pivot is formed with a shouldered recess 110 below which the latch is beveled as indicated at 111, which beveled portion functions in the resetting operation of the bell-crank and associated parts.

Figure 14:
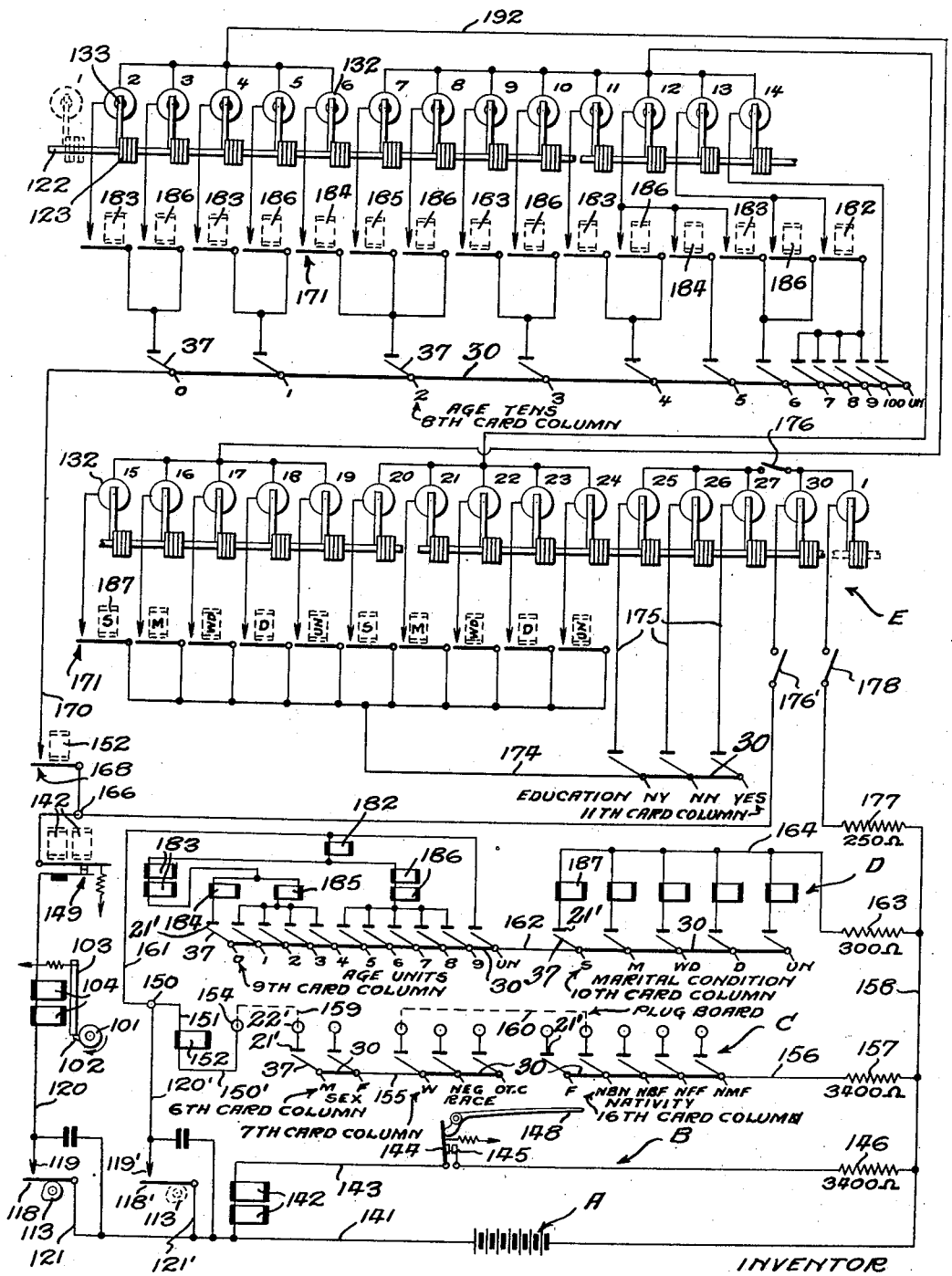
Figure 14 is a diagrammatic view of the circuits generally employed in unit tabulating machines, the counter circuit, counter control relay circuit, and card control circuit being of the kind usually employed, there being shown in connection with these circuits my improved card class control circuit.

Adverting to disk 98, it will be seen that this is provided with a cam 112 which engages the roller 97 to perform the function of the timely unlatching and resetting of the bell-crank 95. Mounted on the shaft 17 a suitable distance to one side of the disk 98 is a cam 113 which is engaged by the roller 114 carried by arm 115 to which is attached a spring 116 tending to keep the roller always in engagement with the cam. Mounted on this arm is an insulating block 117 which carries two contacts 118 and 118', and the counter and relay timing contacts 119 and 119' are connected to conductors 120 and 120', while contacts 118 and 118' are connected to conductors 121 and 121' (Figs. 4 and 14).

It will be seen from the above description and from the drawings that when the timing contacts are made, the sequence of timing of the pawl 92, cam 91, cam 112, cam 113, and friction drum 101, if the card is properly punched, prevents the shifting of the sleeves on the shafts 62 and 64. On the other hand, when an improperly punched card goes through the machine, the magnet 104 is not energized and armature 103 is in contact with lug 102 on the friction drum 101, holding it against rotation, as shown in dotted line position on Figure 4 at which stopped position the pawl 92 is out of engagement with the rocker arm 86, allowing roller 90 to follow the face of cam 91, thereby permitting feed rolls on sleeves 78 and 79 to shift and reject the card.

The counter mechanism

The numeral 122 (Fig. 7) designates the counter-wheel shaft which is driven independently of the card feed head shaft 50 (Fig. 2). It rotates constantly and has mounted thereon in each machine unit counter wheels 123 frictionally mounted on the shaft. These wheels are of the type illustrated and described in U. S. Patent 1,516,772 issued to Eugene M. La Boiteaux. The wheels do not rotate with the shaft except at such times as they are released by the escapement member, and then in the present instance only for one digit at a time.

Secured to the face of each counter-wheel is a ratchet 124 and the periphery of this wheel is provided with digits "0" to "9," all as usual, and each counter-wheel includes an additional disk 125 which carries a transfer lug 126 for carrying from one wheel to the next, also as usual. In the present instance, in the unit machine, each counter includes four counter-wheels with counting capacity up to 9999. These wheels are arranged on the counter shaft and are separated a proper distance from each other and are usually arranged in gangs or groups of ten counters to a shaft, as will appear more clearly in the diagrammatic showing in Figure 14.

The numeral 127 designates an escapement anchor pivoted on a shaft 128 suitably mounted in the counter-housing, the anchor being formed with an arm 129 provided with a shoulder 130 arranged to engage one of the ratchet teeth. In Figure 7 the parts are in the position they occupy when the magnets 132 are not energized, but when they are, the armature 133 will be rocked on its pivot 134, and through link 135, pivoted to the armature and to the arm 136 of the escapement anchor, will bring the shoulder 130 out of engagement with the ratchet and will allow the lower end of the arm 131 to move into position for engagement with a tooth on the ratchet on the counter-wheel against the influence of spring 137, to arrest the movement of the wheel. When a wheel has reached its capacity of nine, the lug 126 engages a cam surface 138 on the adjacent escapement anchor to permit the adjoining counter-wheel to move one notch and thereby carry a unit to said counter-wheel.

Referring now to Figure 8, it will be noted that the lower feed rolls 9 and 9' carry, respectively, cams 67 and 67' which are adapted to lift the feed rollers 8 and 8' simultaneously, at which moment the information is taken from the card, the card being stopped momentarily by reason of friction shoes (not shown) and that the feed rollers, although continuing to rotate, are not in feeding contact with the card. The cam 67 is shorter than the cam 67'. Therefore the roller 8 drops off the cam 67, permitting the feed rolls 8 and 9 to grip the card while the edge of the card is not in contact with the feed rolls 8' and 9', thus preventing the card from being torn.

The feed roll 8 carries a disk 139 which is of the same diameter as the roll, and a similar disk 140 is carried by the feed roll 8', which disks are engaged by the cams 67 and 67', the disk and feed roll assembly being such that only the feed roll portions run on the card.

In Figures 9 and 10 are shown enlarged fragmentary details of the contact block, brush holder and shuttle plate. In Figure 9 the positions of the parts are those in which the card has stopped momentarily and one of the brushes is positioned to make contact through the hole of the card when the shuttle plate is moved through the medium of the cam 48 to straighten up the brush mounting and brush, forcing the brush through the hole in the card, making contact with the contact surface of the contact pin 21, as shown in Figure 10. At this point the brush is resting on the tungsten contact surface of the pin in position to make effective electrical contact, which contact is made at the instant the contacts 119, 119', 118 and 118' are closed by the cam 113, as shown in Figure 4 in detail and diagrammatically in Figure 14.

Figure 11 shows three brush holders and the manner of mounting them in the strip of insulating material 28 and the manner of supporting the opposite end of the brush holder is shown in Figure 1. In the present showing there are only three brush holders, but it will be understood that this number may be increased or diminished in accordance with the information to be tabulated, and where only three holders are used as shown, blank metallic brushless strips, such as 30', are employed to support and keep in shape that portion of the card that is not being tabulated, or from which no information is being taken.

With special reference to Figure 17, it is pointed out that the letters "V" and "X" and numerals "0" to "9" horizontally placed below the brush holder 30, correspond with designations vertically arranged in the various fields or subdivisions of the card, as in Figure 13.

The brushes 37 in the brush holders 30 are arranged to make contact with the contact points 21 connected to conductors 22 leading to plug-board jacks 22', any one of which jacks corresponding to a designation in any card column may be plugged into, to effect any desired combination with other columns.

Circuits

Referring to Figure 14, A designates a source of electrical power. There are shown in this figure four complete circuits, namely, "card control," "card-class control," "relay" and "counter circuit." B is the card control circuit, C the card-class control circuit, D the counter-relay circuit and E the counter circuit.

Card control circuit

The card control circuit is for the purpose of controlling the machine when there are no cards passing through. Starting from the source A (220 volts), the current passes over conductor 141 to and through card control relay 142, through conductor 143, contacts 144 and 145 to high resistance 146. The armature 147 of the relay 142 is normally closed, but when a card actuates the "no card" lever 148 which opens contacts 144 and 145, the armature 147 causes contacts 149 in the counter circuit to close. The no-card lever 148, when a card is present in the machine, lies in the groove of feed roll 9' (Figure 8), but when there is no card, the lever lies in the groove in the upper feed roll 8'.

Card class control circuit

The card class control circuit is for the purpose of allowing the cards of a certain "sort" or class to be tabulated and all other cards rejected. Starting again at the source of current A, the current passes over common feed conductor 141 to timing contacts 118' and 119' through conductor 120' to connecting post 150. A conductor 151 leads from this post to the high resistance card class control relay 152, and from thence over conductor 150' to line jack 154. In this circuit (on the diagram) is a brush holder 30 for the subdivision of "sex," the brush holder being in this instance, as throughout the diagrammatic showing, represented by a heavy line. This holder is connected to the adjacent brush holder by a conductor 155 to the subdivision "race," there being shown another brush holder for "nativity." The "nativity" subdivision brush holder is connected by a conductor 156 to a high resistance 157 through which the current returns to source over common return conductor 158. As shown, the line jack 154 is connected to another jack 22', by dotted conductor 159 which leads to the first jack in the "sex" subdivision through a conductor 22 to contact point 21, to brush 37. The "sex" brush holder, as we have seen, is connected to "race" brush holder by conductor 155, and the first jack in the second subdivision "race" is connected by dotted conductor 160 with the second jack of the third subdivision "nativity," from which subdivision the current passes over conductor 156 to high resistance 157, before mentioned, and from thence back to common source of current through conductor 158.

From the description immediately preceding it will be seen that the "set-up" is for "male" (M) in "sex" with "white" (W) in "race," and native born of native parents (NBN) in "nativity" subdivision. This subdivision represents a class of the cards to be tabulated, and cards punched other than indicated will be rejected or not tabulated.

In the circuits in which the brush holders are involved the class control magnet 152 and resistance 157 are both of high resistance, thus reducing to a minimum the amount of current passing through the card class control brushes, whereby, as stated in the preamble, their life and usefulness are prolonged.

When a card is properly punched in the class control area the high resistance relay magnet 152 is momentarily energized through the medium of the cam 113 which closes the contacts 118' and 119', thus allowing current to pass through contacts 168 to the counter circuit. When a card is improperly punched, this relay 152 will not be energized and consequently contacts 168 will remain open, thus preventing current from reaching the counter circuit, and when no current can pass beyond the contacts 168, the several circuits cannot be completed and the improperly punched card will be rejected. It will be noted the card reject magnet 104 is not energized at this time by an improperly punched card, and the pivoted armature 103, under the influence of its spring, engages lug 102 on frictionally mounted drum 101 preventing said drum from rotating on shaft 15, thus initiating the reject cycle as previously described in connection with Figures 4 and 5.

Counter relay circuit

This circuit is for the purpose of controlling combinations to be counted on the counters, each of which as has been explained, comprises four disks with its associated mechanisms. Starting again at the source of current, the current passes through conductor 141 to timing counter contact 118' to contact 119' and from thence over conductor 120' to connecting post 150, and from there over conductor 161 to counter relay magnets 182, 183, 184 to contact 21', brush 37, or "0" brush in "age" units brush holder 30, from thence over conductor 162 to "marital condition" brush holder 30, to brush 37 designated "S" meaning single, through contact 21' to counter relay magnet 187 over conductor 164, and resistance 163, back to source. As illustrated, the current can only pass to counter magnet numbered "6" due to the fact that "2" in the "age tens" brush holder in eighth card column has made contact, allowing counter relay magnet 184 to complete the circuit to the counter magnet 132 numbered "6," the counter relay magnets 183 and 182 serving merely as means to convey the current through their windings. Counter relay magnet 183 has five pairs of contacts, none of which functions in connection with counter "6." Relay magnet 182 has one pair of contacts which do not function in connection with this counter. The other two pairs of contacts that belong to magnet 182 are not being used in the circuit. It is sometimes desirable to use several pairs of contacts to control several counter magnets, as the exigencies of the case may require.

Counter circuit

The counter circuit is for the purpose of operating the counters hereinbefore described in detail in connection with the mechanical showing in Figure 7, which counters are for tabulating information taken from the card, which as usual, is represented by holes punched in the card, which holes, in the present instance, represent "age," "sex" "nativity," etc. On the card illustrated, or any information whatever which may be likewise represented on any card bearing any other information, statistical or otherwise, may be tabulated.

Starting at the source A, current passes over the common feed wire 141 to counter timing contacts 118 and 119, over conductor 120 to reject magnet 104, which magnet is one employed in the machine and which is arranged to operate with each tabulated card to insure its proper position in the card receptacle after tabulation. As shown in Figure 4, and as described in connection therewith, this magnet is energized momentarily by each properly punched card by reason of contact being made through the various holes of the properly punched card, but when a card is punched not in accordance with the particular set-up, the magnet remains inoperative and the armature 103 (Figure 4) holds the lug 102 on frictionally-mounted drum 101 from rotating, thereby permitting the reject mechanism to shift or function to reject the card.

From the reject magnet 104 the current passes to contacts 149 of card control magnet 142 (Figure 14) to the contact points 168 of the card class control relay 152 through conductor 170 to (age tens) brush holder 30, to brushes 37 through suitable conductors to "age" units relay contact points 171 and to counter magnets 132. These counter magnets are diagrammatically shown in Figure 14 and mechanically shown in Figure 7. They control the count of individual items rather than adding amounts represented by figures punched in a card.

As shown in Figure 14, the counters "2" to "6" represent persons twenty years of age and under in the "age" subdivision, while counters "7" to "14" represent persons twenty-one years of age and over, including unknown age. The "marital condition" of these two groups of ages is counted on counters "15" to "19" for twenty years of age and under, and on counters "20" to "24" for twenty-one years and over, together with "unknown" ages.

The marital condition counter magnets 132 are connected to marital condition relay contacts 171 by suitable conductors. The marital condition relay contacts 171 are connected to "education" brush holder 30 by conductor 174, and this brush holder is connected to education counter magnets "25" to "27" by suitable conductors 175.

Interposed between counter magnets 27 and 30 is a manually operated switch 176 and between the total counter magnet numbered "1" and resistance 177 is another manually operated switch 178, and between counter magnet 30 and connecting post 166 is still another manually operated switch 176'. When switches 176 and 178 are closed and 176' is open, all cards that are punched correctly will be counted on total counter number "1." For instance, 400 cards are run through the machine. Of these, 398 properly punched cards that have completed appropriate circuits will be counted on number "1" counter, and the remaining two improperly punched cards which have failed to complete the proper circuits will be rejected. When the entire 400 cards have been run, the two rejected cards will, as shown in Figure 3, extend slightly beyond the others in the stack. These, the operator will remove to be re-run, and before re-running them the switches 176' and 178 will be closed, and switch 176 will be open. In feeding these two cards, the no-card control lever 148 will be depressed, opening contacts 144 and 145 (Figure 8), preventing current from passing through card control magnet 142, thus causing contacts 149 to close under the influence of its spring, there being at this time no attraction between the card control magnet 142 and its armature. During a revolution of cam 113 its high point will, through the medium of arm 115 (Figure 4), close contacts 118 and 118', and 119 and 119', allowing current over conductor 120 to pass through card-reject magnet 104, contact 149, connecting post 166, over conductor to switch 176', which is now closed, to and through counter magnet 30 and to counter magnet "1" through switch 178, which is now closed, to resistance 177, back to source. It will be understood that for the two rejected cards we have been considering, two revolutions of cam 113 will be required, one revolution for each card. These two rejected cards will register on the unit wheel of counter 30, and also on total counter number "1."

In accordance with the showing on the card (Figure 13) and diagram 14, the card or cards punched for this information must have been run through the sorting machine seven times to condition it to give on the result sheet information in printed form relative to the number of persons twenty years old, single and educated, in a particular geographical area. Say for instance, 400 cards supposed to be punched as shown, were run through the machine, and it should happen that one or more of the cards had been incorrectly punched, or the perforation is off-gauge, such card would be rejected; and say, that of the 400 cards, two were improperly punched, "2" would be printed in the "rejected" column of the result sheet, and "398" would appear in several columns under appropriate headings on the sheet, and "400" would appear in the first or "total" column.

In the plug-board shown in Figure 12 there are three vertical columns of jacks 22', from "V" to "9," there being an additional special jack "L" 154, and as illustrated, the special jack is shown connected with jack "V" in first column, which, in Figure 14, is for male, and "V" in the second column is connected with "X" in the third column, which is for "white" in "race," and with "NBN" which is for nativity. In Figure 15, the hook-up is for male, "M;" white, "W;" "NBF," "NF" and "NMF," and for such hook-up jack 154 will be used with "V" jack in first column and a separate connection will be effected between "V" in second column to "1" in the third column. In this instance the conductors leading to jacks "0," "1" and "2" on plug-board are removed and tied together, and a single lead is connected to number "1" jack on plug-board. This will allow a card which has been punched for either "NBF," "NFF" or "NMF" to pass through the machine without rejection. It is sometimes desirable to entirely eliminate a particular class, in the present instance "nativity," in which case I may use any conductor leading from any jack 22' in the third plug-board column by disconnecting the conductor 22 leading to contact 21', and connecting directly to conductor 180. It will be seen that by connecting jack "V" in second plug-board column to appropriate jack 22' in third column, the "nativity" class is eliminated.

In Figure 15 is shown a card sort circuit similar to that shown in Figure 14, the difference being in the arrangement of nativity subdivision, wherein there is a consolidation effected of native born persons, both parents foreign born; father foreign born, mother native; and mother foreign born and father native. This arrangement joins together all combinations in nativity subdivision of native born persons with both or one parent foreign born, on third jack 154 in nativity subdivision. In the same row of plug-board is a jack 179 connected directly to conductor 180, which arrangement eliminates the brush holder and brushes entirely from the nativity subdivision sort. This arrangement for sort control can be used on any one or more subdivisions of a punched card. The circuit (Figure 15) is separately illustrated for the purpose of showing where it would be inserted in Figure 14 replacing the card class control in the general lay-out. It will be seen, starting at connecting post 150 and ending with the resistance 157, that Figure 15 shows a complete circuit capable of operating in conjunction with the other circuits in the machine.

In Figure 16 there is shown a card class control circuit somewhat more flexible than that shown in Figures 14 and 15. In Figure 14, in the nativity field, a separate jack 154 is used for each designation, whereas in Figure 16 there is provided a plug-board receptacle 181, which is a strip of conducting material provided with a suitable number of plug holes 182. This receptacle has normally no permanent electrical connection with any other part of the plug-board. By this arrangement I am enabled to effect the separate connection of nativity subdivision shown in Figure 16; also the consolidation of nativity subdivision as shown in Figure 15, or any other combination of nativity subdivision, by plugging from plug receptacle 181 to any jack or number of jacks of nativity subdivision, and then plugging from plug receptacle to appropriate jack in the race subdivision.

It is to be understood that while I have illustrated but one plug receptacle, any number of these may be used having any desired number of plug holes, whereby any number of combinations of subdivisions on any punched card may be effected.

In the arrangement illustrated in Figure 17 there are shown three brush holders 30 to which is connected a sufficient number of jacks 22' to cover all of the designations in each of any three vertical card columns, such as are shown in Figure 13, or from "V" vertically to "9." For the symbols "V" and "X" appearing on the illustrated card and on the plug-board, may be substituted any suitable or appropriate symbols or designations according to the layout of the card with respect to any information to be ascertained by tabulation.

*Operation*

The operation of the circuit will be described in relation to the particularly and partially punched sample card shown in Figure 13. This card is punched male (M) in sex subdivision in card column number "6;" white (W) in race subdivision in card column numbered "7." In card columns "8" and "9," "2" and "0" (20) are punched in age subdivision, in card column "10" marital condition subdivision (MC), "S" (single) is punched. In education subdivision in card column "11," "yes" is punched, and finally in card column "16" nativity subdivision, "NBN" is punched, meaning native born both parents native.

It is to be understood that the card illustrated is merely intended to show a degree of punching to bring it into conformity with the "lay-out," or "set-up" illustrated in other figures of the drawings, and that ordinarily a card would be punched in each card subdivision to record various information as the exigencies of the case may require. On this particular card, male, white, native born, parents native, represent the class of the card which may be for such person in any particular geographical area; the other punching, age, marital condition, and education represent other information desired to be tabulated in detail respecting male, white person, native born or native born parents.

*Card control circuit*

When the cards are passing through the machine, the card control contacts 144 and 145 (Figure 14) are open, thereby closing card control contacts 149. When there are no cards passing through, card control contacts 144 and 145 are closed, and the card control contacts 149 are open.

*Card class control circuit*

It will be noted that the class control is set up so that only cards punched for male white and native born, both parents native, will operate the card class control circuit, including the card class control relay 152, which closes class control relay contacts 168.

*Counter relay circuit*

This circuit, as before stated, is for the purpose of counting combinations of one or more holes in conjunction with other information on one or more counters in the counter circuit. The partly-punched card, as we have seen, is punched twenty years old in "age," that is, "2" in the "tens" card column "8" and "0" in the "units" column "9" of the ages, and "S" denoting single with respect to marital condition, in card column "10" and "yes" in education card column "11," the last designation denoting that the person can read and write.

In this counter relay circuit the current passes from source A to conductor 141, to relay timing contacts 118' and 119', to connecting post 150, along conductor 161, through relay 182 to two relays 183 and one relay 184, thence to a brush 37, the "0" brush, along the age units brush holder 30. From this brush holder current passes over conductor 162 to marital condition brush 37, the "S" brush, through relay 187, along conductor 164 to resistance 163 and over conductor 158 back to source. This illustrated card would operate the above numbered relays, thereby closing the contacts of these relays which are used in the counter circuit.

*Counter circuit*

The purpose of this circuit is to count the items or combinations of items punched in the card which items are counted on counter wheels 123 (Figures 7 and 14), whose capacity is large enough to count the items on any one of the usual run of cards. In this circuit the current passes from the source A along a conductor 141 to counter timing contacts 118 and 119 through card reject magnet 104, through card control relay contacts 149 to connecting post 166, through plug-board control relay contacts 168 and age "tens" brush holder 30, through a brush "2," to suitable conductors to relay contacts 171 of relay 184, and from there to counter magnet 132 ("6") in the subdivision of age counters from "2" to "14," which counter "6" is arbitrarily arranged to count persons of twenty years of age. Ages are divided into two groups. Persons twenty years of age and under are counted on counters "2" to "6," while counters designated "7" to "14" count persons twenty-one years of age and over, together with unknown ages. This subdivision was made for the purpose of tabulating marital condition by the two age groups above mentioned. On counters "15" to "19" are counted the five subdivisions of marital condition, single, married, widowed, divorced and unknown, of persons twenty years of age and under, while on the counters "20" to "24" are counted the same subdivisions of marital conditions for persons of twenty-one years and over including unknown ages. From counters "2" to "6" which represent twenty years of age and under, the current continues on conductor 192 to martial condition counters "15" to "19" for persons twenty years of age and under, and from counter "15" to relay contacts 171 of relay 187 through conductor 174 to education brush holder 30 through "yes" brush to counter 27 of the group of three counters "25" to "27" which counters count the three subdivisions of education, which are arbitrarily represented on the diagram (Figure 14) by "NY," "NN" and "Yes," and from this group of three counters through switch 176 the current passes to total counter "1" through switch 178 to resistance 177, over conductor 188 to source.

From the diagrammatic lay-out (Figure 14) and the sample punch card (Figure 13) it will be seen that the card punched "M," male, "W" white, and "NBN" native born both parents native, will operate the card class control, while the "0" in age (units) column and "S" (single) in "MC" marital condition, will operate relays 184 and 187, and hole "2" in tens column of ages in the counter circuit, in conjunction with contacts of relay 184 of age units, will operate the counter "6," and in the marital condition counters, counter "15" will be operated through contacts of relay 187 of marital condition. Counter "27" will be operated by the hole punched "yes" in the education column and the total number of cards will be counted on counter "1." Thus there will be tabulated or counted from this card the following information about male white people, native born, both parents native, twenty years of age on counter "6" and single persons on counter "15" of the group of twenty years of age and under and can read and write in education on counter 27, and the total of such persons will be counted on total counter "1."

I claim:

1. In a tabulating machine, a plurality of counters, each having an operating magnet therefor, a plurality of columns of card sensing brushes corresponding with a plurality of card columns, a plurality of counter circuits, each including one of said counter magnets and one or more of the brushes in a given column, a plurality of counter relays actuated by sensing brushes in other columns and each relay controlling one or more of said counter circuits, a card class control circuit including selectively connected brushes responsive to a predetermined class for sensing the card columns and only operative when there is agreement between the selected sensing brushes and the perforations in the card columns, a relay in the card class control circuit, contacts controlled by said relay, said relay being energized by the said class control circuit passing progressively through selectively connected brushes, each brush constituting an element of a combined classification.

2. In a tabulating machine, a plurality of counters, each having an operating magnet therefor, a plurality of columns of card sensing brushes corresponding with a plurality of card columns, a plurality of counter circuits, each including one of said counter magnets and one or more of the brushes in a given column, a plurality of counter relays actuated by sensing brushes in other columns and each relay controlling one or more of said counter circuits, a card class control circuit including selectively connected brushes responsive to a predetermined class for sensing the card columns and only operative when there is agreement between the selected sensing brushes and the perforations in the card columns, a relay in the card class control circuit, contacts controlled by said relay, said relay being energized by the said class control circuit passing progressively through selectively connected brushes, each brush constituting an element of a combined classification, means for feeding perforated record cards one by one to the brushes, and means for displacing a card relative to the other cards when there is a disagreement between the selectively connected brushes and the perforations in the record card column.

EDGAR A. NELSON, Jr.